United States Patent
Yang et al.

(10) Patent No.: US 10,361,640 B2
(45) Date of Patent: Jul. 23, 2019

(54) CASCADED PHOTOVOLTAIC GRID-CONNECTED INVERTER, CONTROL METHOD AND CONTROL DEVICE FOR THE SAME

(71) Applicant: SUNGROW POWER SUPPLY CO., LTD., Hefei, Anhui (CN)

(72) Inventors: Le Yang, Anhui (CN); Shineng Yu, Anhui (CN); Jun Xu, Anhui (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 258 days.

(21) Appl. No.: 15/581,748

(22) Filed: Apr. 28, 2017

(65) Prior Publication Data

US 2018/0054065 A1 Feb. 22, 2018

(30) Foreign Application Priority Data

Aug. 19, 2016 (CN) .......................... 2016 1 0692688

(51) Int. Cl.
*H02M 7/538* (2007.01)
*H02M 7/5387* (2007.01)
(Continued)

(52) U.S. Cl.
CPC ............. *H02M 7/5387* (2013.01); *H02J 3/18* (2013.01); *H02J 3/1842* (2013.01); *H02J 3/383* (2013.01);
(Continued)

(58) Field of Classification Search
CPC ... H02M 1/42; H02M 7/49; H02J 3/18; Y02E 10/58
See application file for complete search history.

(56) References Cited

U.S. PATENT DOCUMENTS 8,982,590 B2   3/2015   Giraut Ruso et al.
2005/0063115 A1   3/2005   Nayar et al.
(Continued)

FOREIGN PATENT DOCUMENTS

CN   104201982 A   12/2014
CN   105790302 A   7/2016
(Continued)

OTHER PUBLICATIONS

Extended European Search Report corresponding to Application No. 17168807.0-1804; dated Dec. 1, 2017.
(Continued)

*Primary Examiner* — Yusef A Ahmed
(74) *Attorney, Agent, or Firm* — Cantor Colburn LLP

(57) ABSTRACT

Provided are a cascaded photovoltaic grid-connected inverter and a control method and control device thereof. The method includes: determining whether at least one of inverter units of the inverter is over-modulated; if yes, calculating a maximum reactive power and a minimum reactive power permitted to be injected to a power grid in a situation that a power factor of a system is not less than a minimum permitted value; simulating an operation state of the inverter after the maximum reactive power is injected to the power grid and determining whether each of the inverter units in the operation state is in a modulating region; if yes, injecting a suitable reactive power to the power grid; and if no, controlling the inverter to exit an operation mode of independently performing maximum power point tracking control on each photovoltaic panel.

13 Claims, 5 Drawing Sheets

(51) Int. Cl.
*H02J 3/18* (2006.01)
*H02J 3/38* (2006.01)

(52) U.S. Cl.
CPC .............. *H02J 3/385* (2013.01); *Y02E 10/58* (2013.01); *Y02E 40/22* (2013.01)

(56) References Cited

U.S. PATENT DOCUMENTS

| | | | | |
|---|---|---|---|---|
| 2011/0130889 A1* | 6/2011 | Khajehoddin | .......... | H02J 3/383 700/298 |
| 2011/0140535 A1* | 6/2011 | Choi | .......... | H02J 3/32 307/82 |
| 2011/0187198 A1* | 8/2011 | Williams | .......... | H02J 1/12 307/71 |
| 2012/0049637 A1* | 3/2012 | Teichmann | .......... | H02J 3/26 307/82 |
| 2013/0009700 A1* | 1/2013 | Deboy | .......... | H02J 3/383 327/581 |
| 2013/0027993 A1* | 1/2013 | Tan | .......... | H02M 7/515 363/40 |
| 2013/0076144 A1* | 3/2013 | Agamy | .......... | H01L 31/02021 307/77 |
| 2013/0131884 A1* | 5/2013 | Jain | .......... | H02J 3/383 700/297 |
| 2013/0155735 A1* | 6/2013 | Ilic | .......... | H02M 7/72 363/71 |
| 2013/0155739 A1* | 6/2013 | Itako | .......... | G05F 1/67 363/95 |
| 2013/0187473 A1* | 7/2013 | Deboy | .......... | H02M 7/49 307/82 |
| 2014/0175888 A1* | 6/2014 | Deboy | .......... | H02J 3/383 307/82 |
| 2014/0211529 A1* | 7/2014 | Kandasamy | .......... | H02M 7/797 363/131 |
| 2015/0008748 A1* | 1/2015 | Deboy | .......... | H02J 3/383 307/77 |
| 2015/0015072 A1* | 1/2015 | Deboy | .......... | H02M 7/537 307/52 |
| 2015/0340964 A1* | 11/2015 | Modeer | .......... | H02J 3/383 307/82 |
| 2015/0357933 A1* | 12/2015 | Li | .......... | H02M 7/49 307/52 |
| 2016/0094148 A1 | 3/2016 | Ni et al. | | |
| 2016/0276837 A1* | 9/2016 | Manjrekar | .......... | H02J 3/383 |
| 2016/0372926 A1* | 12/2016 | Pahlevaninezhad | .... | H02J 3/382 |
| 2017/0018932 A1* | 1/2017 | Pahlevaninezhad | .... | H02J 3/385 |
| 2017/0214337 A1* | 7/2017 | Baronian | .......... | H02M 7/539 |
| 2017/0294875 A1* | 10/2017 | Xu | .......... | H02M 7/49 |
| 2017/0310239 A1* | 10/2017 | Xu | .......... | H02H 3/093 |
| 2018/0054057 A1* | 2/2018 | Xu | .......... | H02J 3/1807 |

FOREIGN PATENT DOCUMENTS

| | | |
|---|---|---|
| EP | 2490312 A1 | 8/2012 |
| EP | 3001530 A1 | 3/2016 |
| WO | 03084041 A1 | 10/2003 |

OTHER PUBLICATIONS

Qingyun Huang et al., "Independent DC Link Voltage Control of Cascaded Multilevel PV Inverter," FREEDM Systems Center, Department of Electrical and Computer Engineering, Mar. 20, 2016, pp. 2727-2734.

SIPO Summary of the First Office Action corresponding to Application No. 201610692688.3; dated May 21, 2018.

* cited by examiner

CASCADED PHOTOVOLTAIC GRID-CONNECTED INVERTER, CONTROL METHOD AND CONTROL DEVICE FOR THE SAME

CROSS REFERENCE TO RELATED APPLICATION

The present application claims the priority to Chinese Patent Application No. 201610692688.3, titled "CASCADED PHOTOVOLTAIC GRID-CONNECTED INVERTER, CONTROL METHOD AND CONTROL DEVICE FOR THE SAME", filed on Aug. 19, 2016 with the State Intellectual Property Office of the PRC, which is incorporated herein by reference in its entirety.

FIELD

The present disclosure relates to the field of photovoltaic power generation technology, and more particularly to a cascaded photovoltaic grid-connected inverter and a control method and a control device for the cascaded photovoltaic grid-connected inverter.

BACKGROUND

A cascaded photovoltaic grid-connected inverter includes N cascaded inverter units (such as an H-bridge inverter unit). A single phase topology of the inverter is shown in FIG. 1. A direct current side of each of the inverter units is connected to an independent photovoltaic panel, alternating current sides of the inverter units are connected in series, and then connected with a power grid through a grid-connected inductor L.

In order to improve a utilization ratio of solar energy, a Maximum Power Point Tracking (MPPT) control is independently performed on each photovoltaic panel in the cascaded photovoltaic grid-connected inverter. In a case that outputting active powers of the inverter units are seriously unbalanced due to factors such as uneven illumination, it is easy to generate a phenomenon that an inverter unit is over-modulated.

Currently, a method preventing the inverter unit from being over-modulated is to inject a reactive power to the power grid. However, injecting the reactive power to the power grid lowers a power factor of a system, and the power factor of the system may be less than a minimum permitted value.

SUMMARY

In view of this, a cascaded photovoltaic grid-connected inverter and a control method and a control device for the cascaded photovoltaic grid-connected inverter are provided by the disclosure to solve a problem that an inverter unit is over-modulated and avoid a power factor of a system from being less than a minimum permitted value.

A control method for a cascaded photovoltaic grid-connected inverter is provided, which includes:
 determining whether at least one of inverter units of the cascaded photovoltaic grid-connected inverter is over-modulated;
 calculating a maximum reactive power and a minimum reactive power permitted to be injected to a power grid in a situation that a power factor of a system is not less than a minimum permitted value, in a case that at least one of the inverter units of the cascaded photovoltaic grid-connected inverter is over-modulated;
 simulating an operation state of the cascaded photovoltaic grid-connected inverter after the maximum reactive power is injected to the power grid and determining whether each of the inverter units in the operation state is in a modulating region;
 injecting a reactive power to the power grid in a case that each of the inverter units in the operation state is in the modulating region, where a value of the reactive power is not less than the minimum reactive power and not greater than the maximum reactive power; and
 controlling the cascaded photovoltaic grid-connected inverter to exit an operation mode of independently performing a maximum power point tracking control on each of photovoltaic panels, in a case that not all the inverter units in the operation state are in the modulating region.

The determining whether at least one of the inverter units of the cascaded photovoltaic grid-connected inverter is over-modulated includes:
 acquiring a direct current side current maximum value and a grid side current effective value of the cascaded photovoltaic grid-connected inverter;
 determining whether the grid side current effective value is less than M times of the direct current side current maximum value, where $$M = \frac{\sqrt{2}}{\lambda},$$

λ is a maximum permitted value of a modulation degree in a current modulation strategy; and
 determining that at least one of the inverter units of the cascaded photovoltaic grid-connected inverter is over-modulated in a case that the grid side current effective value is less than M times of the direct current side current maximum value.

The determining whether each of the inverter units in the operation state is in the modulating region includes:
 calculating a grid side current effective value after the maximum reactive power is injected to the power grid;
 determining whether the grid side current effective value after the maximum reactive power is injected to the power grid is less than M times of a direct current side current maximum value; and
 determining that each of the inverter units is in the modulating region after the maximum reactive power is injected to the power grid, in a case that the grid side current effective value after the maximum reactive power is injected to the power grid is less than M times of the direct current side current maximum value.

The injecting the reactive power to the power grid includes injecting the minimum reactive power to the power grid.

Each of the photovoltaic panels connected to a direct current side of the cascaded photovoltaic grid-connected inverter is connected with a controllable switch in series, and where
 before determining whether at least one of the inverter units of the cascaded photovoltaic grid-connected inverter is over-modulated, the method further includes:
 determining whether the cascaded photovoltaic grid-connected inverter meets a grid connection condition;

executing a step of determining whether at least one of the inverter units of the cascaded photovoltaic grid-connected inverter is over-modulated, in a case that the cascaded photovoltaic grid-connected inverter meets the grid connection condition; and controlling the controllable switch connected in series with the photovoltaic panel having a lowest direct current output voltage to be switched off and adjusting a voltage instruction value of a bus capacitor corresponding to the photovoltaic panel having the lowest direct current output voltage to make the cascaded photovoltaic grid-connected inverter meet the grid connection condition, in a case that the cascaded photovoltaic grid-connected inverter does not meet the grid connection condition.

The determining whether the cascaded photovoltaic grid-connected inverter meets the grid connection condition includes:

determining whether a sum of voltages of bus capacitors of the inverter units of the cascaded photovoltaic grid-connected inverter is less than a grid power voltage amplitude;

determining that the cascaded photovoltaic grid-connected inverter does not meet the grid connection condition, in a case that the sum of the voltages of the bus capacitors of the inverter units of the cascaded photovoltaic grid-connected inverter is less than the grid power voltage amplitude; and determining that the cascaded photovoltaic grid-connected inverter meets the grid connection condition, in a case that the sum of the voltages of the bus capacitors of the inverter units of the cascaded photovoltaic grid-connected inverter is not less than the grid power voltage amplitude.

A control device for a cascaded photovoltaic grid-connected inverter is provided, which includes:

a first determining unit, configured to determine whether at least one of inverter units of the cascaded photovoltaic grid-connected inverter is over-modulated;

a calculating unit, configured to calculate a maximum reactive power and a minimum reactive power permitted to be injected to a power grid in a situation that a power factor of a system is not less than a minimum permitted value, in a case that the first determining unit determines that at least one of the inverter units of the cascaded photovoltaic grid-connected inverter is over-modulated;

a second determining unit, configured to simulate an operation state of the cascaded photovoltaic grid-connected inverter after the maximum reactive power is injected to the power grid and determine whether each of the inverter units in the operation state is in a modulating region;

a first processing unit, configured to inject a reactive power to the power grid in a case that the second determining unit determines that each of the inverter units is in the modulating region after the maximum reactive power is injected to the power grid, where a value of the reactive power is not less than the minimum reactive power and not greater than the maximum reactive power; and a second processing unit, configured to control the cascaded photovoltaic grid-connected inverter to exit an operation mode of independently performing a maximum power point tracking control on each of photovoltaic panels, in a case that the second determining unit determines that not all the inverter units are in the modulating region after the maximum reactive power is injected to the power grid.

The first processing unit is configured to inject the minimum reactive power to the power grid in a case that the second determining unit determines that each of the inverter units is in the modulating region after the maximum reactive power is injected to the power grid.

Each of the photovoltaic panels connected to a direct current side of the cascaded photovoltaic grid-connected inverter is connected with a controllable switch in series, the device further includes:

a third determining unit, configured to determine whether the cascaded photovoltaic grid-connected inverter meets a grid connection condition; and a third processing unit, configured to control the controllable switch connected in series with the photovoltaic panel having a lowest direct current output voltage to be switched off and set a voltage instruction value of a bus capacitor corresponding to the photovoltaic panel having the lowest direct current output voltage to make the cascaded photovoltaic grid-connected inverter meet the grid connection condition, in a case that the third determining unit determines that the cascaded photovoltaic grid-connected inverter does not meet the grid connection condition, and where the first determining unit is configured to determine whether at least one of the inverter units of the cascaded photovoltaic grid-connected inverter is over-modulated, in a case that the third determining unit determines that the cascaded photovoltaic grid-connected inverter meets the grid connection condition.

A cascaded H-bridge photovoltaic grid-connected inverter is provided, which includes any one of the above control devices for a cascaded photovoltaic grid-connected inverter.

As can be seen from the above technical solutions, in a case that the inverter unit of the cascaded photovoltaic grid-connected inverter is over-modulated, it is simulated and determined whether both a requirement of a power factor of a system and a requirement of preventing an inverter unit from being over-modulated may be met by adopting a method of injecting a reactive power to a grid power. In a case that both the requirement of the power factor of the system and the requirement of preventing the inverter unit from being over-modulated can be met, the reactive power is injected to the grid power. In a case that either the requirement of the power factor of the system or the requirement of preventing the inverter unit from being over-modulated can not be met, the cascaded photovoltaic grid-connected inverter is controlled to exit a MPPT control mode, an objective of meeting both the requirement of the power factor of the system and the requirement of preventing the inverter unit from being over-modulated is implemented by sacrificing a utilization ratio of solar energy.

BRIEF DESCRIPTION OF THE DRAWINGS

In order to describe technical solutions in embodiments of the present disclosure or in conventional technology more clearly, hereinafter drawings to be used in the description of the embodiments or the conventional technology are introduced simply. Apparently, the drawings described below only describe some embodiments of the present disclosure. Those skilled in the art can obtain other drawings based on these drawings without any creative work.

DETAILED DESCRIPTION OF EMBODIMENTS

Hereinafter, technical solutions of embodiments of the present disclosure will be described clearly and completely below in conjunction with the drawings of the embodiments of the disclosure. Apparently, the described embodiments are some rather than all of the embodiments of the present disclosure. Any other embodiments obtained based on the embodiments of the present disclosure by those skilled in the art without any creative work fall within the protection scope of the present disclosure.

Figure 1:
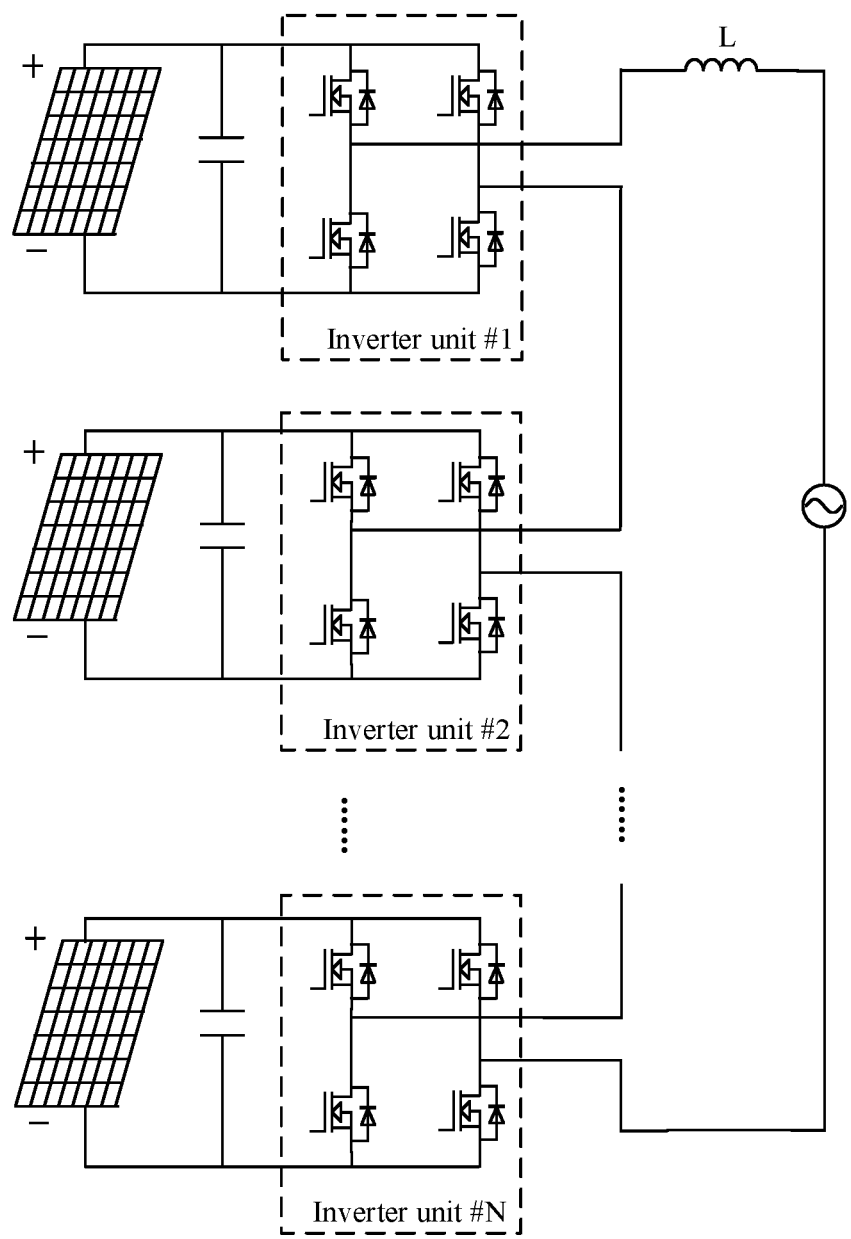
FIG. 1 is a schematic structural diagram of a single phase topology of a cascaded photovoltaic grid-connected inverter in the conventional technology.
Figure 2:
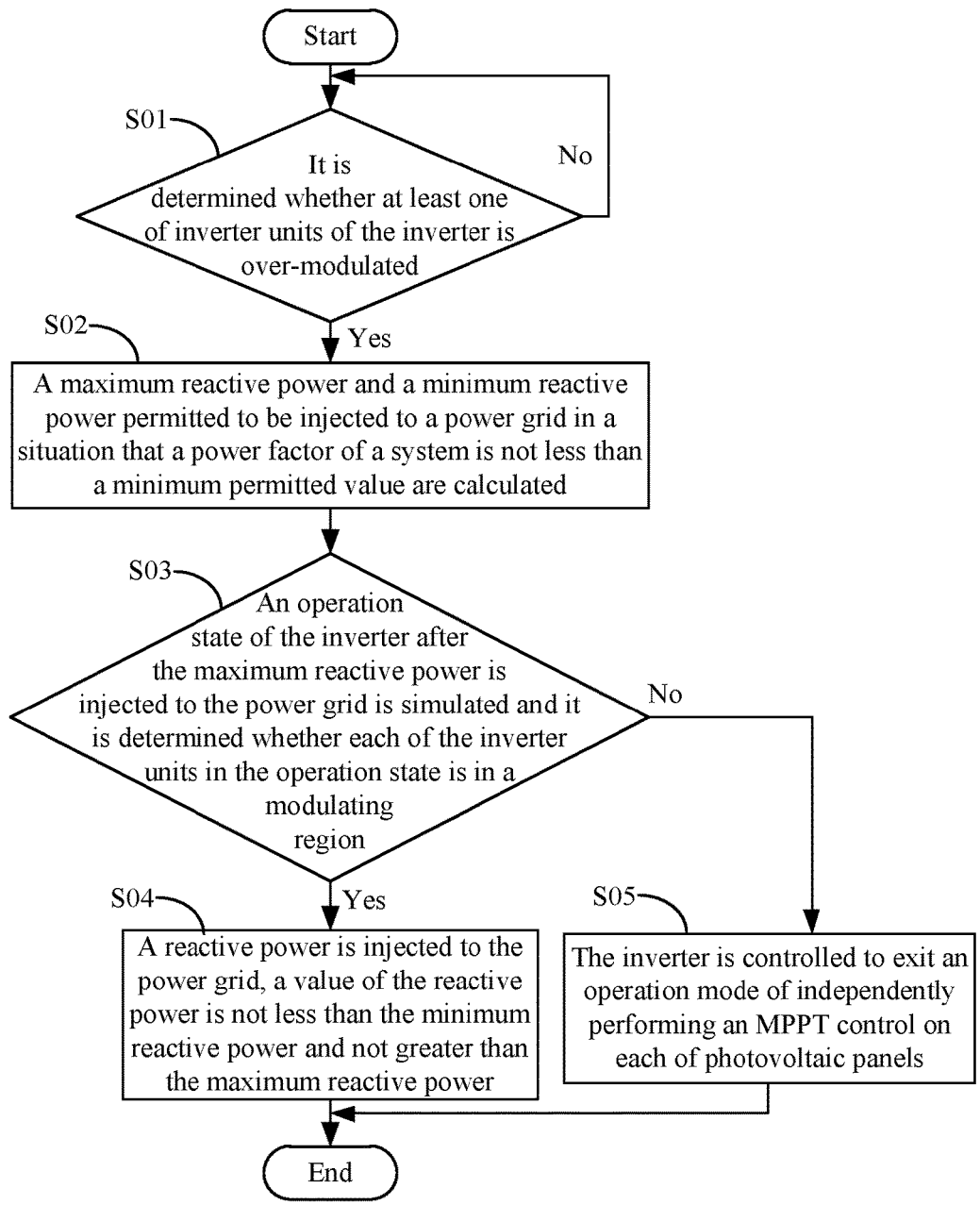
FIG. 2 is a flow chart of a control method for a cascaded photovoltaic grid-connected inverter according to an embodiment of the disclosure.

Referring to FIG. 2, a control method for a cascaded photovoltaic grid-connected inverter is disclosed by an embodiment of the disclosure to avoid a power factor of a system from being less than a minimum permitted value when solving a problem that an inverter unit is over-modulated. The control method includes steps S01 to S05.

In step S01, it is determined whether at least one of inverter units of the cascaded photovoltaic grid-connected inverter is over-modulated. Step S02 is executed in a case that at least one of inverter units of the cascaded photovoltaic grid-connected inverter is over-modulated. Step S01 is repeatedly executed in a case that none of the inverter units of the cascaded photovoltaic grid-connected inverter is over-modulated.

Determining whether at least one of the inverter units of the cascaded photovoltaic grid-connected inverter is over-modulated may use a following criterion. The criterion includes: acquiring a direct current side current maximum value $(I_{pvi})_{max}$ and a grid side current effective value $I_s$ of the cascaded photovoltaic grid-connected inverter; determining whether $I_s < M(I_{pvi})_{max}$ is met, where $$M = \frac{\sqrt{2}}{\lambda},$$

$\lambda$ is a maximum permitted value of a modulation degree in a current modulation strategy; determining that at least one of the inverter units of the cascaded photovoltaic grid-connected inverter is over-modulated in a case that $I_s < M(I_{pvi})_{max}$ is met; and determining that all of the inverter units of the cascaded photovoltaic grid-connected inverter are in a modulating region in a case that $I_s < M(I_{pvi})_{max}$ is not met. A reasoning process for the criterion is described as follows.

Firstly, an output active power of an inverter unit #i (i=1, 2 ... N) in the cascaded photovoltaic grid-connected inverter is defined as $P_{i-dc}$.

$$P_{i-ac} = \hat{v}_{Hi}\sin(\omega t) \cdot \hat{i}_s \sin(\omega t) = \frac{1}{2}\hat{v}_{Hi}\hat{i}_s[1-\cos(2\omega t)] = V_{Hi} \cdot I_s \quad \text{formula (1)}$$

$\hat{v}_{Hi}$ is an output voltage amplitude of the inverter unit #i, $\hat{i}_s$ is an output current amplitude of the inverter unit #i, $\omega$ is the frequency, t is the time, $V_{Hi}$ is an output voltage effective value of the inverter unit #i, $I_s$ is an output current effective value of the inverter unit #i, $I_s$ is also the grid side current effective value of the cascaded photovoltaic grid-connected inverter.

In order to simplify the system, only a fundamental component is considered and a double frequency power fluctuation is omitted. The formula (1) may be simplified as $$P_{i-ac} = \frac{1}{2}\hat{v}_{Hi}\hat{i}_s = V_{Hi} \cdot I_s \quad \text{formula (2)}$$

It is defined that a direct current side of the inverter unit #i is connected to a photovoltaic panel #PVi. It is known that the output active power $P_{i-dc}$ of the inverter unit #i is an output power of the photovoltaic panel #PVi, i.e., $$P_{i-dc} = V_{pvi} \cdot I_{pvi} \quad \text{formula (3)}$$

$V_{pvi}$ is an output voltage of the photovoltaic panel #PVi, $I_{pv}$ is an output current of the photovoltaic panel #PVi.

Formula (2) and formula (3) are combined based on a principle that the active power at the direct current side and the alternating current side of the inverter unit #i are constant, to obtain $$V_{pvi} \cdot I_{pvi} = \frac{1}{2}\hat{v}_{Hi}\hat{i}_s = V_{Hi} \cdot I_s \quad \text{formula (4)}$$

A modulation degree of the inverter unit #i is defined as $m_i$, $$m_i = \frac{v_{Hi}}{V_{pvi}} \quad \text{formula (5)}$$

$v_{Hi}$ is an output voltage instantaneous value of the inverter unit #i.

Formula (4) and formula (5) are combined to obtain $$m_i = \frac{v_{Hi}}{V_{pvi}} = \frac{\hat{v}_{Hi}\sin(\omega t)}{V_{pvi}} = \frac{2I_{pvi}}{\hat{i}_s}\sin(\omega t) = \frac{\sqrt{2}\,I_{pvi}}{I_s}\sin(\omega t) \quad \text{formula (6)}$$

It is known that a range of $m_i$ is $[-\lambda, \lambda]$. A specific value of $\lambda$ is related to a current modulation strategy adopted by the cascaded photovoltaic grid-connected inverter. The modulation strategy may be a sine wave modulation strategy, a space vector modulation strategy or a step wave modulation strategy, which is not limited. The range of $m_i$ is substituted to formula (6) to obtain a condition of avoiding the invert unit #i from being over-modulated is $$\left|\frac{\sqrt{2}\,I_{pvi}}{I_s}\sin(\omega t)\right| \leq \lambda \quad \text{formula (6)}$$

According to formula (6), a condition that none of the inverter units of the cascaded photovoltaic grid-connected inverter is over-modulated is $$M(I_{pvi})_{max} \leq I_s, M = \frac{\sqrt{2}}{\lambda} \qquad \text{formula (7)}$$

$(I_{pvi})_{max}$ is a maximum value among output currents of inverter unit #1 to inverter unit #N, which is a direct current side current maximum value of the cascaded photovoltaic grid-connected inverter.

According to formula (7), if $I_s < M(I_{pvi})_{max}$, it is determined that at least one of the inverter units of the cascaded photovoltaic grid-connected inverter is over-modulated, and if $I_s \geq M(I_{pvi})_{max}$, it is determined that none of the inverter units of the cascaded photovoltaic grid-connected inverter is over-modulated. In this way, the criterion is proved.

In step S02, a maximum reactive power a and a minimum reactive power b permitted to be injected to a power grid in a situation that a power factor of a system is not less than a minimum permitted value are calculated.

A process of obtaining the maximum reactive power a and the minimum reactive power b in a situation that the power factor of a photovoltaic system is not less than a threshold is already known by those skilled in the art as a common knowledge, which is not described here.

In step S03, an operation state of the cascaded photovoltaic grid-connected inverter after the maximum reactive power a is injected to the power grid is simulated and it is determined whether each of the inverter units #1 to #N in the operation state is in a modulating region. Step S04 is executed in a case that each of the inverter units #1 to #N in the operation state is in a modulating region. Step S05 is executed in a case that not all the inverter units #1 to #N in the operation state are in a modulating region.

Determining whether each of the inverter units in the operation state is in the modulating region may use a following criterion. The criterion includes:

calculating a grid side current effective value $I_s(\varphi_{max})$ after the maximum reactive power a is injected to the power grid;

determining whether $I_s(\varphi_{max})$ is less than $M(I_{pvi})_{max}$;

determining that each of the inverter units is in the modulating region after the maximum reactive power a is injected to the power grid, in a case that $I_s(\varphi_{max})$ is less than $M(I_{pvi})_{max}$ that is to say, injecting the maximum reactive power a to the power grid can make the cascaded photovoltaic grid-connected inverter be in a state that none of the inverter units is over-modulated; and determining that injecting any reactive power having a value in range [b, a] to the grid power can not make the cascaded photovoltaic grid-connected inverter be in a state that none of the inverter units is over-modulated due to a strict requirement of the power factor of the system, in a case that $I_s(\varphi_{max})$ is not less than $M(I_{pvi})_{max}$, that is to say, either the requirement of the power factor of the system or a requirement of preventing the inverter unit from being over-modulated can not be met by injecting a reactive power to the grid power.

In step S04, a reactive power is injected to the power grid, where the reactive power is not less than the minimum reactive power b and not greater than the maximum reactive power a.

In a case that it is found by simulation that injecting the maximum reactive power a to the power grid can make the cascaded photovoltaic grid-connected inverter be in a state that none of the inverter units is over-modulated, injecting any reactive power having a value in range [b, a] to the grid power can make the cascaded photovoltaic grid-connected inverter be in a state that none of the inverter units is over-modulated, and can not result in a case that the power factor of the system is less than the minimum permitted value.

The less the reactive power injected to the gird power is, the less an effect made on the power factor of the system is, so the reactive power injected to the grid power is the minimum reactive power b in this embodiment to reduce the effect made on the power factor of the system caused by injecting the reactive power to a great extent. A grid power factor angle in a case that the minimum reactive power b is injected to the grid power is $$\varphi_{min} = -\tan^{-1}\left(\frac{\sqrt{[M(I_{pvi})_{max}]^2 - I_s^2}}{I_s}\right).$$

In step S05, the cascaded photovoltaic grid-connected inverter is controlled to exit an operation mode of independently performing an MPPT control on each of photovoltaic panels.

In a case that either the requirement of the power factor of the system or a requirement of preventing the inverter unit from being over-modulated can not be met by injecting a reactive power to the grid power, in the embodiment, the cascaded photovoltaic grid-connected inverter is controlled to exit the operation mode in which the inverter unit is over-modulated caused by outputting active powers of the inverter units being seriously unbalanced. After the cascaded photovoltaic grid-connected inverter exits the operation mode, although a utilization ratio of solar energy of the system is lowered, a voltage of a bus capacitor of the inverter unit #i is greater than a direct current side instruction voltage of the inverter unit #i. At this time, a direct current side current of the inverter unit #i is inevitably lowered which makes the inverter unit #i be kept in a modulating state, so there is no problem that the power factor of the system is lowered caused by a need of injecting the reactive power to the grid power.

As can be seen from the above technical solutions, in a case that the inverter unit of the cascaded photovoltaic grid-connected inverter is over-modulated, it is simulated and determined whether both a requirement of a power factor of a system and a requirement of preventing an inverter unit from being over-modulated may be met by adopting a method of injecting a reactive power to a grid power. In a case that both the requirement of the power factor of the system and the requirement of preventing the inverter unit from being over-modulated can be met, the reactive power is injected to the grid power. In a case that either the requirement of the power factor of the system or the requirement of preventing the inverter unit from being over-modulated can not be met, the cascaded photovoltaic grid-connected inverter is controlled to exit a MPPT control mode, an objective of meeting both the requirement of the power factor of the system and the requirement of preventing the inverter unit from being over-modulated is implemented by sacrificing a utilization ratio of solar energy.

In addition, a prerequisite of executing the above control method for the cascaded photovoltaic grid-connected inverter is the cascaded photovoltaic grid-connected inverter being in a grid-connected state. However, in a case that outputting active powers of the inverter units are seriously unbalanced due to factors such as uneven illumination, the cascaded photovoltaic grid-connected inverter may do not meet the grid connection condition, therefore, the following technical solution is further provided by the embodiment.

Figure 3:
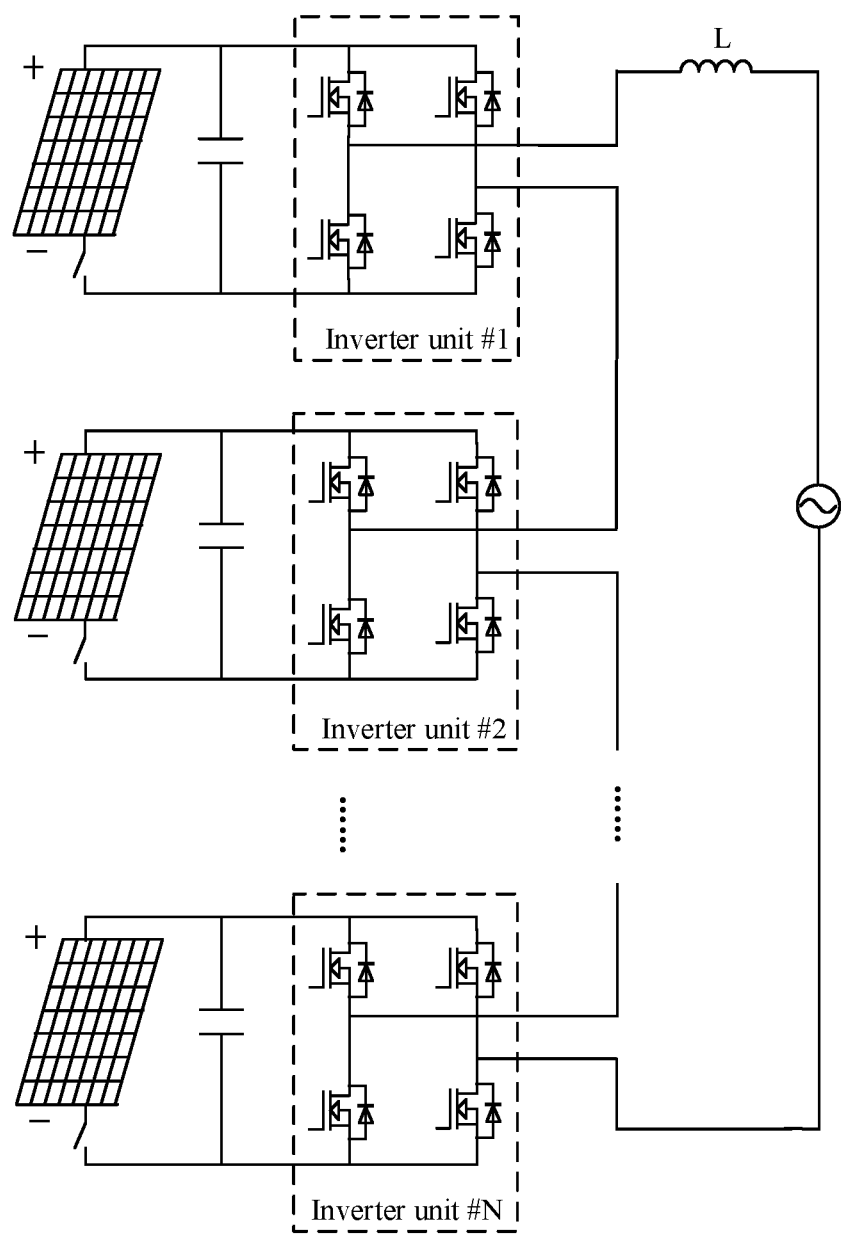
FIG. 3 is a schematic structural diagram of a single phase topology of a cascaded photovoltaic grid-connected inverter according to an embodiment of the disclosure.
Figure 4:
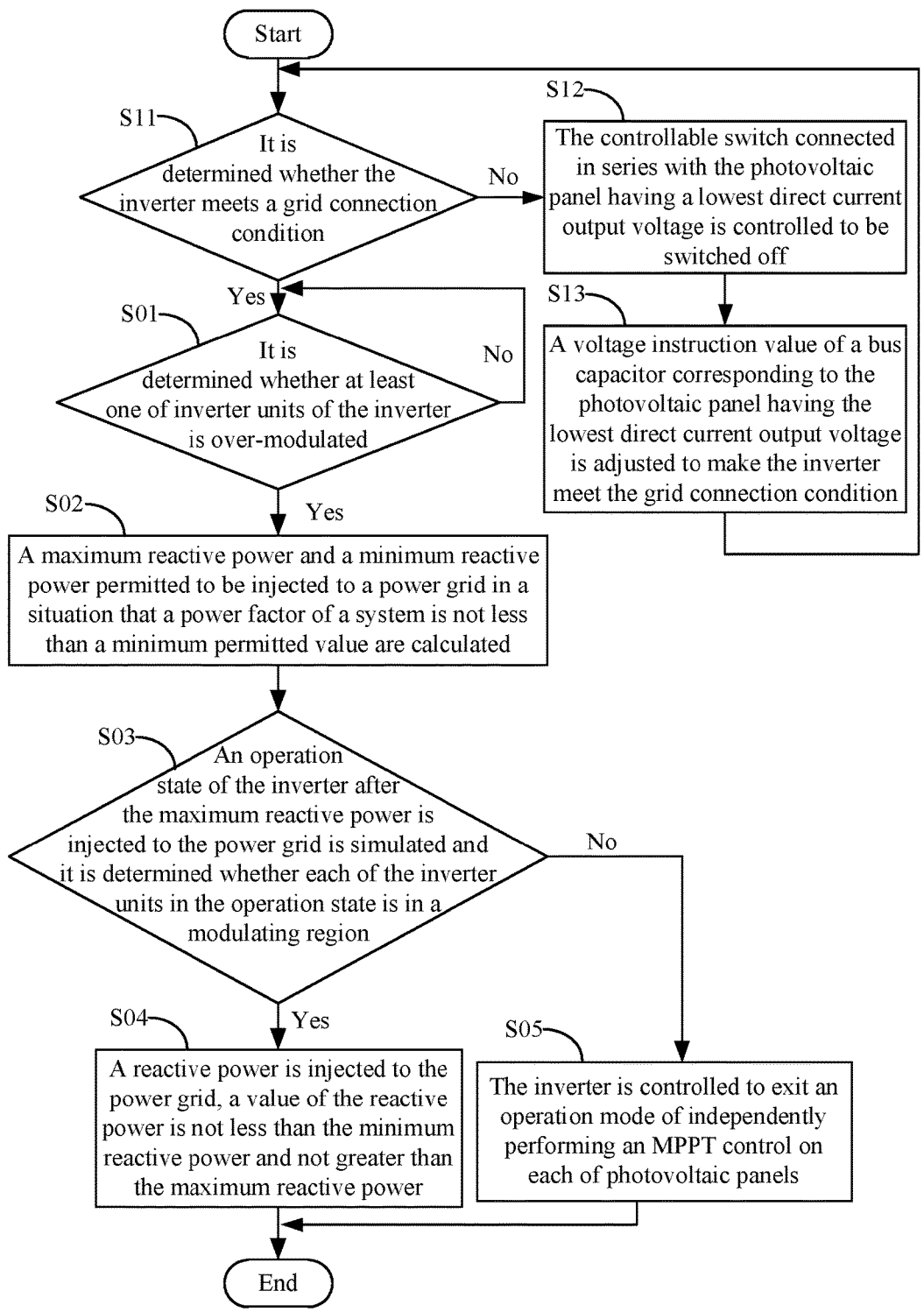
FIG. 4 is a flow chart of a control method for a cascaded photovoltaic grid-connected inverter according to an embodiment of the disclosure.

Referring to FIG. 4, another control method for a cascaded photovoltaic grid-connected inverter is provided by the embodiment, which is applied in a cascaded photovoltaic grid-connected inverter shown in FIG. 3. Each of the photovoltaic panels connected to a direct current side of the cascaded photovoltaic grid-connected inverter is connected with a controllable switch in series, the method includes S01 to S13.

In step S11, it is determined whether the cascaded photovoltaic grid-connected inverter meets a grid connection condition. Step S01 is executed in a case that the cascaded photovoltaic grid-connected inverter meets the grid connection condition. Step S12 is executed in a case that the cascaded photovoltaic grid-connected inverter does not meet the grid connection condition.

A case that the cascaded photovoltaic grid-connected inverter does not meet the grid connection condition means that when an output voltage of the cascaded photovoltaic grid-connected inverter is less than a threshold, $$\sum_{i=1}^{N} V_{pvi} < \hat{v}_s \cdot \sum_{i=1}^{N} V_{pvi}$$

is a sum of voltages of bus capacitors of the inverter units of the cascaded photovoltaic grid-connected inverter. $\hat{v}_s$ is a grid power voltage amplitude. Correspondingly, determining whether the cascaded photovoltaic grid-connected inverter meets a grid connection condition may use a following criterion. The criterion includes: determining whether $$\sum_{i=1}^{N} V_{pvi}$$

is less than $\hat{v}_s$; determining that the cascaded photovoltaic grid-connected inverter does not meet the grid connection condition, in a case that $$\sum_{i=1}^{N} V_{pvi} < \hat{v}_s;$$

and determining that the cascaded photovoltaic grid-connected inverter meets the grid connection condition, in a case that $$\sum_{i=1}^{N} V_{pvi}$$

is not less than $\hat{v}_s$.

A difference between this embodiment and the above embodiment is that steps S11 to S13 is added in this embodiment to ensure the cascaded photovoltaic grid-connected inverter always meets the grid connection condition.

In step S12, the controllable switch connected in series with the photovoltaic panel having a lowest direct current output voltage is controlled to be switched off.

In step S13, a voltage instruction value of a bus capacitor corresponding to the photovoltaic panel having the lowest direct current output voltage is adjusted to make the cascaded photovoltaic grid-connected inverter meet the grid connection condition, and then step S11 is performed.

In a case that a direct current side of the inverter unit #i is connected to a photovoltaic panel #PVi, the bus voltage of the inverter unit #i is under constraint of the photovoltaic panel #PVi, which can not be willingly changed. In this case, if the controllable switch connected in series with the photovoltaic panel #PVi is switched off, the cascaded photovoltaic grid-connected inverter meets $$\sum_{i=1}^{N} V_{pvi} < \hat{v}_s$$

and so to meet the gird connection condition by adjusting the bus voltage of the inverter unit #i.

In step S01, it is determined whether at least one of inverter units of the cascaded photovoltaic grid-connected inverter is over-modulated. Step S02 is executed in a case that at least one of inverter units of the cascaded photovoltaic grid-connected inverter is over-modulated. Step S01 is repeatedly executed in a case that none of the inverter units of the cascaded photovoltaic grid-connected inverter is over-modulated.

In step S02, a maximum reactive power a and a minimum reactive power b permitted to be injected to a power grid in a situation that a power factor of a system is not less than a minimum permitted value are calculated.

In step S03, an operation state of the cascaded photovoltaic grid-connected inverter after the maximum reactive power a is injected to the power grid is simulated and it is determined whether each of the inverter units in the operation state is in a modulating region. Step S04 is executed in a case that each of the inverter units in the operation state is in a modulating region. Step S05 is executed in a case that not all the inverter units in the operation state are in a modulating region.

In step S04, a reactive power is injected to the power grid, where the reactive power is not less than the minimum reactive power b and not greater than the maximum reactive power a.

In step S05, the cascaded photovoltaic grid-connected inverter is controlled to exit an operation mode of independently performing an MPPT control on each of photovoltaic panels.

Figure 5:
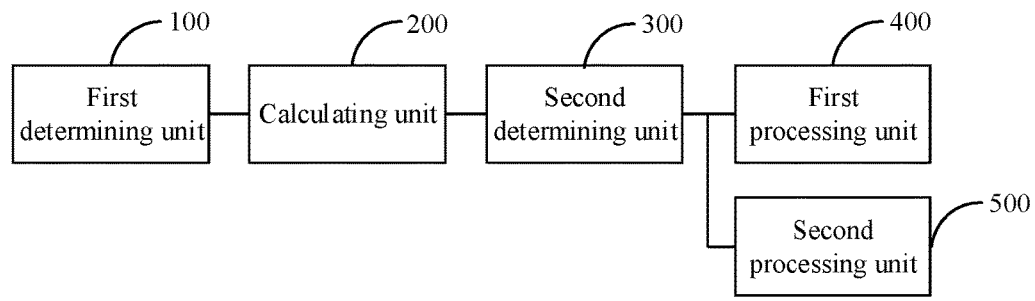
FIG. 5 is a schematic structural diagram of a control device for a cascaded photovoltaic grid-connected inverter according to an embodiment of the disclosure.
Figure 6:
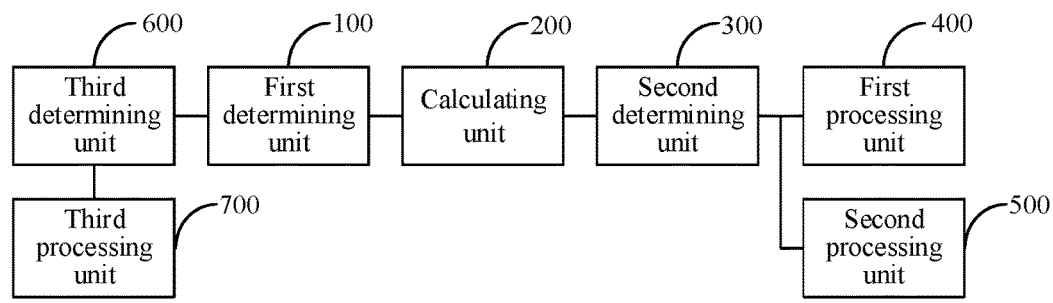
FIG. 6 is a schematic structural diagram of a control device for a cascaded photovoltaic grid-connected inverter according to an embodiment of the disclosure.

In addition, referring to FIG. 5, a control device for a cascaded photovoltaic grid-connected inverter is further disclosed by an embodiment according to the disclosure, which includes a first determining unit 100, a calculating unit 200, a second determining unit 300, a first processing unit 400 and a second processing unit 500.

The first determining unit 100 is configured to determine whether at least one of inverter units of the cascaded photovoltaic grid-connected inverter is over-modulated.

The calculating unit 200 is configured to calculate a maximum reactive power and a minimum reactive power permitted to be injected to a power grid in a situation that a power factor of a system is not less than a minimum permitted value, in a case that the first determining unit 100 determines that at least one of the inverter units of the cascaded photovoltaic grid-connected inverter is over-modulated.

The second determining unit 300 is configured to simulate an operation state of the cascaded photovoltaic grid-connected inverter after the maximum reactive power is injected to the power grid and determine whether each of the inverter units in the operation state is in a modulating region.

The first processing unit 400 is configured to inject a reactive power to the power grid in a case that the second determining unit 300 determines that each of the inverter units is in the modulating region after the maximum reactive power is injected to the power grid, where a value of the reactive power is not less than the minimum reactive power and not greater than the maximum reactive power.

The second processing unit 500 is configured to control the cascaded photovoltaic grid-connected inverter to exit an operation mode of independently performing a maximum power point tracking control on each of photovoltaic panels, in a case that the second determining unit 300 determines that not all the inverter units are in the modulating region after the maximum reactive power is injected to the power grid.

The first processing unit 400 is configured to inject the minimum reactive power to the power grid in a case that the second determining unit 300 determines that each of the inverter units is in the modulating region after the maximum reactive power is injected to the power grid.

In a case that each of the photovoltaic panels connected to a direct current side of the cascaded photovoltaic grid-connected inverter is connected with a controllable switch in series, the control device for a cascaded photovoltaic grid-connected inverter further includes a third determining unit 600 and a third processing unit 700.

The third determining unit 600 is configured to determine whether the cascaded photovoltaic grid-connected inverter meets a grid connection condition.

The third processing unit 700 is configured to control the controllable switch connected in series with the photovoltaic panel having a lowest direct current output voltage to be switched off and set a voltage instruction value of a bus capacitor corresponding to the photovoltaic panel having the lowest direct current output voltage to make the cascaded photovoltaic grid-connected inverter meet the grid connection condition, in a case that the third determining unit 600 determines that the cascaded photovoltaic grid-connected inverter does not meet the grid connection condition.

The first determining unit 100 is configured to determine whether at least one of the inverter units of the cascaded photovoltaic grid-connected inverter is over-modulated, in a case that the third determining unit 600 determines that the cascaded photovoltaic grid-connected inverter meets the grid connection condition.

In addition, a cascaded H-bridge photovoltaic grid-connected inverter is provided according to the embodiment, which includes any one of the above control devices for a cascaded photovoltaic grid-connected inverter.

In view of the above, according to the disclosure, in a case that the inverter unit of the cascaded photovoltaic grid-connected inverter is over-modulated, it is simulated and determined whether both a requirement of a power factor of a system and a requirement of preventing an inverter unit from being over-modulated may be met by adopting a method of injecting a reactive power to a grid power. In a case that both the requirement of the power factor of the system and the requirement of preventing the inverter unit from being over-modulated can be met, the reactive power is injected to the grid power. In a case that either the requirement of the power factor of the system or the requirement of preventing the inverter unit from being over-modulated can not be met, the cascaded photovoltaic grid-connected inverter is controlled to exit a MPPT control mode, an objective of meeting both the requirement of the power factor of the system and the requirement of preventing the inverter unit from being over-modulated is implemented by sacrificing a utilization ratio of solar energy.

The various embodiments in the disclosure are described progressively. Each embodiment focuses on the difference from other embodiments. The same or similar parts of the various embodiments can be referred to mutually. The device provided by the embodiment is described simply since it corresponds to the method provided by the embodiment, and part of the method description can be referred to, to explain the corresponding parts of the device.

Those skilled in the art can implement or use the disclosure based on the above description of the embodiments. Multiple modifications of these embodiments are apparent to those skilled in the art. The general principle defined herein can be implemented in other embodiments without departing from the spirit or scope of the disclosure. Therefore, this disclosure should not be limited to those embodiments illustrated herein, but should be fit the widest scope consistent to the principle and novelty provided herein.

The invention claimed is:

1. A control method for a cascaded photovoltaic grid-connected inverter, comprising:
    determining whether at least one of inverter units of the cascaded photovoltaic grid-connected inverter is over-modulated;
    calculating a maximum reactive power and a minimum reactive power permitted to be injected to a power grid in a situation that a power factor of a system is not less than a minimum permitted value, in a case that at least one of the inverter units of the cascaded photovoltaic grid-connected inverter is over-modulated;
    simulating an operation state of the cascaded photovoltaic grid-connected inverter after the maximum reactive power is injected to the power grid and determining whether each of the inverter units in the operation state is in a modulating region;
    injecting a reactive power to the power grid in a case that each of the inverter units in the operation state is in the modulating region, wherein a value of the reactive power is not less than the minimum reactive power and not greater than the maximum reactive power; and
    controlling the cascaded photovoltaic grid-connected inverter to exit an operation mode of independently performing a maximum power point tracking control on each of photovoltaic panels, in a case that not all the inverter units in the operation state are in the modulating region,
    wherein the determining whether at least one of the inverter units of the cascaded photovoltaic grid-connected inverter is over-modulated comprises:
    acquiring a direct current side current maximum value and a grid side current effective value of the cascaded photovoltaic grid-connected inverter;
    determining whether the grid side current effective value is less than M times of the direct current side current maximum value, wherein $$M = \frac{\sqrt{2}}{\lambda},$$

$\lambda$, is a maximum permitted value of a modulation degree in a current modulation strategy; and determining that at least one of the inverter units of the cascaded photovoltaic grid-connected inverter is over-modulated in a case that the grid side current effective value is less than M times of the direct current side current maximum value.

2. The method according to claim 1, wherein each of the photovoltaic panels connected to a direct current side of the cascaded photovoltaic grid-connected inverter is connected with a controllable switch in series, and wherein before determining whether at least one of the inverter units of the cascaded photovoltaic grid-connected inverter is over-modulated, the method further comprises:

determining whether the cascaded photovoltaic grid-connected inverter meets a grid connection condition;

executing a step of determining whether at least one of the inverter units of the cascaded photovoltaic grid-connected inverter is over-modulated, in a case that the cascaded photovoltaic grid-connected inverter meets the grid connection condition; and controlling the controllable switch connected in series with the photovoltaic panel having a lowest direct current output voltage to be switched off and adjusting a voltage instruction value of a bus capacitor corresponding to the photovoltaic panel having the lowest direct current output voltage to make the cascaded photovoltaic grid-connected inverter meet the grid connection condition, in a case that the cascaded photovoltaic grid-connected inverter does not meet the grid connection condition.

3. The method according to claim 1, wherein the determining whether each of the inverter units in the operation state is in the modulating region comprises:

calculating a grid side current effective value after the maximum reactive power is injected to the power grid;

determining whether the grid side current effective value after the maximum reactive power is injected to the power grid is less than M times of the direct current side current maximum value; and determining that each of the inverter units is in the modulating region after the maximum reactive power is injected to the power grid, in a case that the grid side current effective value after the maximum reactive power is injected to the power grid is less than M times of the direct current side current maximum value.

4. The method according to claim 3, wherein each of the photovoltaic panels connected to a direct current side of the cascaded photovoltaic grid-connected inverter is connected with a controllable switch in series, and wherein before determining whether at least one of the inverter units of the cascaded photovoltaic grid-connected inverter is over-modulated, the method further comprises:

determining whether the cascaded photovoltaic grid-connected inverter meets a grid connection condition;

executing a step of determining whether at least one of the inverter units of the cascaded photovoltaic grid-connected inverter is over-modulated, in a case that the cascaded photovoltaic grid-connected inverter meets the grid connection condition; and controlling the controllable switch connected in series with the photovoltaic panel having a lowest direct current output voltage to be switched off and adjusting a voltage instruction value of a bus capacitor corresponding to the photovoltaic panel having the lowest direct current output voltage to make the cascaded photovoltaic grid-connected inverter meet the grid connection condition, in a case that the cascaded photovoltaic grid-connected inverter does not meet the grid connection condition.

5. The method according to claim 1, wherein the injecting the reactive power to the power grid comprises injecting the minimum reactive power to the power grid.

6. The method according to claim 5, wherein each of the photovoltaic panels connected to a direct current side of the cascaded photovoltaic grid-connected inverter is connected with a controllable switch in series, and wherein before determining whether at least one of the inverter units of the cascaded photovoltaic grid-connected inverter is over-modulated, the method further comprises:

determining whether the cascaded photovoltaic grid-connected inverter meets a grid connection condition;

executing a step of determining whether at least one of the inverter units of the cascaded photovoltaic grid-connected inverter is over-modulated, in a case that the cascaded photovoltaic grid-connected inverter meets the grid connection condition; and controlling the controllable switch connected in series with the photovoltaic panel having a lowest direct current output voltage to be switched off and adjusting a voltage instruction value of a bus capacitor corresponding to the photovoltaic panel having the lowest direct current output voltage to make the cascaded photovoltaic grid-connected inverter meet the grid connection condition, in a case that the cascaded photovoltaic grid-connected inverter does not meet the grid connection condition.

7. The method according to claim 1, wherein each of the photovoltaic panels connected to a direct current side of the cascaded photovoltaic grid-connected inverter is connected with a controllable switch in series, and wherein before determining whether at least one of the inverter units of the cascaded photovoltaic grid-connected inverter is over-modulated, the method further comprises:

determining whether the cascaded photovoltaic grid-connected inverter meets a grid connection condition;

executing a step of determining whether at least one of the inverter units of the cascaded photovoltaic grid-connected inverter is over-modulated, in a case that the cascaded photovoltaic grid-connected inverter meets the grid connection condition; and controlling the controllable switch connected in series with the photovoltaic panel having a lowest direct current output voltage to be switched off and adjusting a voltage instruction value of a bus capacitor corresponding to the photovoltaic panel having the lowest direct current output voltage to make the cascaded photovoltaic grid-connected inverter meet the grid connection condition, in a case that the cascaded photovoltaic grid-connected inverter does not meet the grid connection condition.

8. The method according to claim 7, wherein the determining whether the cascaded photovoltaic grid-connected inverter meets the grid connection condition comprises:

determining whether a sum of voltages of bus capacitors of the inverter units of the cascaded photovoltaic grid-connected inverter is less than a grid power voltage amplitude;

determining that the cascaded photovoltaic grid-connected inverter does not meet the grid connection condition, in a case that the sum of the voltages of the bus capacitors of the inverter units of the cascaded photovoltaic grid-connected inverter is less than the grid power voltage amplitude; and determining that the cascaded photovoltaic grid-connected inverter meets the grid connection condition, in a case that the sum of the voltages of the bus capacitors of the inverter units of the cascaded photovoltaic grid-connected inverter is not less than the grid power voltage amplitude.

9. A control device for a cascaded photovoltaic grid-connected inverter, comprising:
a first determining unit, configured to determine whether at least one of inverter units of the cascaded photovoltaic grid-connected inverter is over-modulated;
a calculating unit, configured to calculate a maximum reactive power and a minimum reactive power permitted to be injected to a power grid in a situation that a power factor of a system is not less than a minimum permitted value, in a case that the first determining unit determines that at least one of the inverter units of the cascaded photovoltaic grid-connected inverter is over-modulated;
a second determining unit, configured to simulate an operation state of the cascaded photovoltaic grid-connected inverter after the maximum reactive power is injected to the power grid and determine whether each of the inverter units in the operation state is in a modulating region;
a first processing unit, configured to inject a reactive power to the power grid in a case that the second determining unit determines that each of the inverter units is in the modulating region after the maximum reactive power is injected to the power grid, wherein a value of the reactive power is not less than the minimum reactive power and not greater than the maximum reactive power; and
a second processing unit, configured to control the cascaded photovoltaic grid-connected inverter to exit an operation mode of independently performing a maximum power point tracking control on each of photovoltaic panels, in a case that the second determining unit determines that not all the inverter units are in the modulating region after the maximum reactive power is injected to the power grid,
wherein the first determining unit is further configured to:
acquire a direct current side current maximum value and a grid side current effective value of the cascaded photovoltaic grid-connected inverter;
determine whether the grid side current effective value is less than M times of the direct current side current maximum value, wherein $$M = \frac{\sqrt{2}}{\lambda},$$

λ is a maximum permitted value of a modulation degree in a current modulation strategy; and
determine that at least one of the inverter units of the cascaded photovoltaic grid-connected inverter is over-modulated in a case that the grid side current effective value is less than M times of the direct current side current maximum value.

10. The device according to claim 9, wherein the first processing unit is configured to inject the minimum reactive power to the power grid in a case that the second determining unit determines that each of the inverter units is in the modulating region after the maximum reactive power is injected to the power grid.

11. The device according to claim 10, wherein each of the photovoltaic panels connected to a direct current side of the cascaded photovoltaic grid-connected inverter is connected with a controllable switch in series, the device further comprises:
a third determining unit, configured to determine whether the cascaded photovoltaic grid-connected inverter meets a grid connection condition; and
a third processing unit, configured to control the controllable switch connected in series with the photovoltaic panel having a lowest direct current output voltage to be switched off and set a voltage instruction value of a bus capacitor corresponding to the photovoltaic panel having the lowest direct current output voltage to make the cascaded photovoltaic grid-connected inverter meet the grid connection condition, in a case that the third determining unit determines that the cascaded photovoltaic grid-connected inverter does not meet the grid connection condition, and wherein
the first determining unit is configured to determine whether at least one of the inverter units of the cascaded photovoltaic grid-connected inverter is over-modulated, in a case that the third determining unit determines that the cascaded photovoltaic grid-connected inverter meets the grid connection condition.

12. The device according to claim 9, wherein each of the photovoltaic panels connected to a direct current side of the cascaded photovoltaic grid-connected inverter is connected with a controllable switch in series, the device further comprises:
a third determining unit, configured to determine whether the cascaded photovoltaic grid-connected inverter meets a grid connection condition; and
a third processing unit, configured to control the controllable switch connected in series with the photovoltaic panel having a lowest direct current output voltage to be switched off and set a voltage instruction value of a bus capacitor corresponding to the photovoltaic panel having the lowest direct current output voltage to make the cascaded photovoltaic grid-connected inverter meet the grid connection condition, in a case that the third determining unit determines that the cascaded photovoltaic grid-connected inverter does not meet the grid connection condition, and wherein
the first determining unit is configured to determine whether at least one of the inverter units of the cascaded photovoltaic grid-connected inverter is over-modulated, in a case that the third determining unit determines that the cascaded photovoltaic grid-connected inverter meets the grid connection condition.

13. A cascaded H-bridge photovoltaic grid-connected inverter comprising:
a plurality of inverter units;
a control device, comprising:
a first determining unit, configured to determine whether at least one of the inverter units of the cascaded H-bridge photovoltaic grid-connected inverter is over-modulated;
a calculating unit, configured to calculate a maximum reactive power and a minimum reactive power permitted to be injected to a power grid in a situation that a power factor of a system is not less than a minimum permitted value, in a case that the first determining unit determines that the at least one of the inverter units of the cascaded H-bridge photovoltaic grid-connected inverter is over-modulated;

a second determining unit, configured to simulate an operation state of the cascaded H-bridge photovoltaic grid-connected inverter after the maximum reactive power is injected to the power grid and determine whether each of the inverter units in the operation state is in a modulating region;

a first processing unit, configured to inject a reactive power to the power grid in a case that the second determining unit determines that each of the inverter units is in the modulating region after the maximum reactive power is injected to the power grid, wherein a value of the reactive power is not less than the minimum reactive power and not greater than the maximum reactive power; and a second processing unit, configured to control the cascaded H-bridge photovoltaic grid-connected inverter to exit an operation mode of independently performing a maximum power point tracking control on each of photovoltaic panels, in a case that the second determining unit determines that not all the inverter units are in the modulating region after the maximum reactive power is injected to the power grid, wherein the first determining unit is further configured to:

acquire a direct current side current maximum value and a grid side current effective value of the cascaded H-bridge photovoltaic grid-connected inverter;

determine whether the grid side current effective value is less than M times of the direct current side current maximum value, wherein $$M = \frac{\sqrt{2}}{\lambda},$$

λ is a maximum permitted value of a modulation degree in a current modulation strategy; and determine that the at least one of the inverter units of the cascaded H-bridge photovoltaic grid-connected inverter is over-modulated in a case that the grid side current effective value is less than M times of the direct current side current maximum value.

* * * * *